United States Patent [19]

Priese

[11] Patent Number: 4,513,946
[45] Date of Patent: Apr. 30, 1985

[54] VALVE AND VALVE SEALING MEMBER
[75] Inventor: Werner K. Priese, Barrington, Ill.
[73] Assignee: Rockwell International Corporation, Pittsburgh, Pa.
[21] Appl. No.: 397,147
[22] Filed: Jul. 12, 1982
[51] Int. Cl.³ ............................................. F16K 1/228
[52] U.S. Cl. .................................... 251/173; 251/306; 277/200
[58] Field of Search ............... 251/306, 305, 173, 315, 251/185; 277/200, 212 FB; 267/165, 182

[56]  References Cited
U.S. PATENT DOCUMENTS

| | | | |
|---|---|---|---|
| 3,210,107 | 10/1965 | Flumerfelt | 277/212 FB |
| 3,666,236 | 5/1972 | Gachot | 251/306 |
| 3,830,083 | 8/1974 | Hadick et al. | 277/212 FB |
| 4,195,815 | 4/1980 | Stager | 251/306 |
| 4,210,313 | 7/1980 | Chester | 251/306 |
| 4,269,391 | 5/1981 | Saito et al. | 251/315 |
| 4,278,262 | 7/1981 | Mizutani et al. | 277/212 FB |
| 4,281,817 | 8/1981 | Adams et al. | 251/306 |

FOREIGN PATENT DOCUMENTS 383104  12/1964  Switzerland .

Primary Examiner—Martin P. Schwadron
Assistant Examiner—James R. Shay

[57] ABSTRACT

There is disclosed a novel sealing member and arrangement for a valve of the type including a valve body having a fluid passage therethrough and a flow control member movably supported relative to the body for opening and closing the flow passage, such as found in a ball or butterfly type of valve constructions. The valve body and flow control member include, respectively, an annular sealing surface and an annular sealing member support groove or channel confronting the sealing surface and having an annular sealing member disposed therein. The sealing member includes an anchoring portion held between opposed sidewalls of the support groove, and a convoluted portion extending radially inwardly of the anchoring portion, with a sealing portion carried thereby, and designed to extend beyond the groove, for engagement with the sealing surface. The groove sidewalls are of slightly greater axial width than the sealing member to permit limited elastic axial deflection. The convoluted structure also permits a slight elastic radial movement of the sealing member where necessary in order to permit the sealing member to adjust its radial position to achieve proper alignment with the sealing surface. In one embodiment, the convoluted portion, in cross section, is generally of decreasing thickness, in the direction of the sealing surface, thereby simulating a beam of uniform stress. This shape permits axial deflection while encouraging a generally uniform distribution of stress throughout the convoluted portion during axial flexing thereof upon engagement with the sealing surface, substantially preventing detrimental permanent deformation of the sealing member.

6 Claims, 7 Drawing Figures

VALVE AND VALVE SEALING MEMBER

BACKGROUND OF THE INVENTION

This invention relates generally to valves, and more particularly to a novel sealing arrangement or sealing member for a valve.

Of particular interest in the design of valves and valve components is the design of the sealing members and sealing arrangements employed therewith. In this regard, valve designers continually strive to provide a relatively simple and inexpensive, yet highly reliable, sealing arrangement. In valves designed to accommodate fluids at relatively high pressures and/or temperatures, the service life and reliability of the sealing arrangement is of particular importance, and as such new, improved designs are continually sought.

Examples of novel approaches in effecting a simple yet reliable sealing arrangement are shown in the inventor's prior U.S. Pat. Nos. 3,563,510 and 4,044,994. While these arrangements have proven highly effective in a number of applications, the present invention contemplates a novel alternative thereto which provides certain additional advantages and improvements not heretofore obtainable.

Among the factors to be taken into consideration in the design and construction of a valve sealing arrangement are the range of pressures and temperatures which the valve is to be designed to handle, and the basic design of the valve itself. In the latter regard, a valve construction employing a relatively movable flow control member against which the seal must engage, as utilized in a ball, disc, or butterfly types of valves, requires a relatively rugged sealing member. In addition, relatively soft, elastic or elastomeric materials are generally inadequate for sealing in valves which are intended to handle fluids at relatively high pressures and/or temperatures. Accordingly, in uses of this type it is necessary to employ a degree of rigidity or strength in the sealing material, as well as wear resistance to the abrasion resulting from engagement with the flow control member and also solid particles or abrasives in the fluid being transported through the valve.

The sealing member must, however, be capable of attaining effective initial sealing contact, as well as final sealing contact. That is, an operational seal must be maintained between the seal and opposed sealing surface at low line pressures or prior to the time when line pressure is applied to the closed valve structure, as well as in high line pressure situations. On the other hand, the sealing member and arrangement must be possessed of a sufficient degree of elasticity to accommodate the resulting slight movement of the control member under the influence of line pressure. In this regard, the sealing member and arrangement must be capable of elastic movement or deflection to some degree to assure continued effective sealing with the sealing surface, as the point of sealing engagement may change somewhat due to the pressure loading and movement of the flow control member. Moreover, such elasticity of the sealing member and arrangement must be such as to substantially preclude any detrimental permanent deformation thereof, which would tend to render the seal ineffective.

It has been proposed and is known in the art to employ resilient metal seals for high temperature, and/or high pressure applications. However, where the valve and seal must also handle abrasive fluid mixtures, additional problems are encountered. More specifically, while relatively thin metal seals are sufficiently resilient to provide the desired sealing action, they will soon be eroded by the abrasive material. Accordingly, to prevent this erosion, the tendency is to fabricate the seal from a thicker material. With the thicker materials, there is a problem due to lack of resiliency. The present invention, however, overcomes these prior art problems, in that it is sufficiently resilient to provide the desired sealing action, yet is resistant to erosion.

More specifically, with a flexible seal wherein one end thereof is anchored and the intermediate section is relatively rigid, flexing of the seal produces an uneven loading of the seal with the greatest moment occuring at the point of attachment of the seal to the anchored segment. This creates an undesirable stress pattern which can result in permanent deformation and premature failure of the seal. With the present invention, two solutions to this problem are shown, in the first, the seal or sealing member is generally in the form of a folded beam, with the cross section of the seal selected to provide approximately uniform stress or loading. More specifically the cross section of the "beam" which defines the seal is diminishing from the point of fixed connection toward the point of contact with the flow control member. The various cross sectional dimensions, which can be determined using well-known formulas for beams wirh uniform stress, are selected so that the stress in the seal convolutions is approximately constant when the seal is deflected axially by the flow control member. It should be noted that it is this axial deflection that produces the beam type loading. In a second form of the invention, the seal includes a relatively massive, sealing portion in the form of a rigid annular seal or seat ring. The ring is joined to the base section of the overall seal assembly by a relatively thin intermediate section which is corrugated in the axial direction. This design permits the seat ring to move in both the radial and axial directions. More specifically, slight radial movement is provided to permit the seat ring to adjust its radial position to conform to that of the flow control member; further, the seat ring can deflect axially upon engagement with the flow control member. Since the intermediate section in this embodiment is more flexible in the axial direction in order to obtain firm sealing contact with the flow control member, an axially directed biasing force is provided by a spring carried within the seal groove. The spring is preferably in the form of an annular wave spring which may be separate or joined to the overall assembly.

In accordance with the above, the present invention includes a sealing member for a valve of the type including a flow control member and an annular sealing surface. Said annular sealing member has an end portion confronting the sealing surface, and in cross section is convoluted so as to resemble a plurality of corrugations. In one form, the thickness of the seal member segments which define said convolutions decreases in the direction toward the free end of the sealing member. The cross sectional dimensions are selected to simulate a beam of uniform stress, thereby substantially evenly distributing stress throughout the sealing member during engagement with said sealing surface. In a second form, a solid sealing ring is used in conjunction with a corrugated intermediate section, with a wave spring biasing the seal ring axially toward the flow control member.

A valve arrangement in accordance with the invention, and embodying the sealing member, comprises a first element constituting a valve body and defining a flow passage extending therethrough, a second element constituting a flow control member movably supported relative to said body for opening and closing said flow passage, one of said elements defining an annular sealing surface and the other of said elements defining an annular sealing member support groove oriented to confront said sealing surface, said annular sealing member being disposed in said support groove and having a first segment fixedly anchored in said support groove and a second segment extending radially inwardly thereof. The second segment includes a free or opposite end which confronts the sealing surface for engagement therewith. The dimension of the support groove is sufficiently large to permit axial deflection of the second segment. As an additional feature, said second segment includes one or more corrugations that also permits the seal to be compressed radially. The resiliency of the seal member, i.e. its tendency to return to its original position serving to effect a fluid tight seal.

BRIEF DESCRIPTION OF THE DRAWINGS

The foregoing as well as other objects, features and advantages of the invention will become apparent from the following detailed description, and upon reference to the drawings, in which.

DETAILED DESCRIPTION OF THE ILLUSTRATED EMBODIMENT

The invention, as illustrated, will be described initially with reference to the specific embodiment of FIGS. 1-5, with that of FIG. 6 and 7 discussed subsequently. However, it is recognized that various alternatives and modifications may become apparent to those skilled in the art upon reading the present disclosure, and therefore it is not intended that the invention be limited to the specific embodiment described herein, but rather it is intended that said invention cover such modifications and alternatives, insofar as they are included within the scope of the appended claims.

In accordance with the present invention, there is provided a sealing member and arrangement adapted for use with a valve of the type having a flow chamber and a flow control member such as a ball or disc, relatively movable within the flow chamber between closed and open positions. The ball or disc, as is known in the art, may also experience some degree of relative axial movement within the flow chamber, in response to high fluid pressure at either side thereof. Accordingly, the present invention provides a sealing member and arrangement such that reliable sealing with the closed flow control member is assured without regard for its relative position due to fluid pressure applied from either side, or to an absence of fluid pressure. Moreover, the novel sealing member and arrangement, although of sufficient rigidity to withstand high temperatures and/or pressures and/or abrasive conditions is also sufficiently elastically deflectable or deformable to take up the stresses applied thereto during sealing with a confronting sealing surface, without experiencing permanent deformation. To facilitate the description of the invention, the sealing member and arrangement are illustrated and described herein as embodied in a valve wherein the flow control member employed is a disc. However, it will be appreciated that the principles of the invention are equally applicable to other types of valves as for example wherein the flow control member is a ball.

Figure 1:
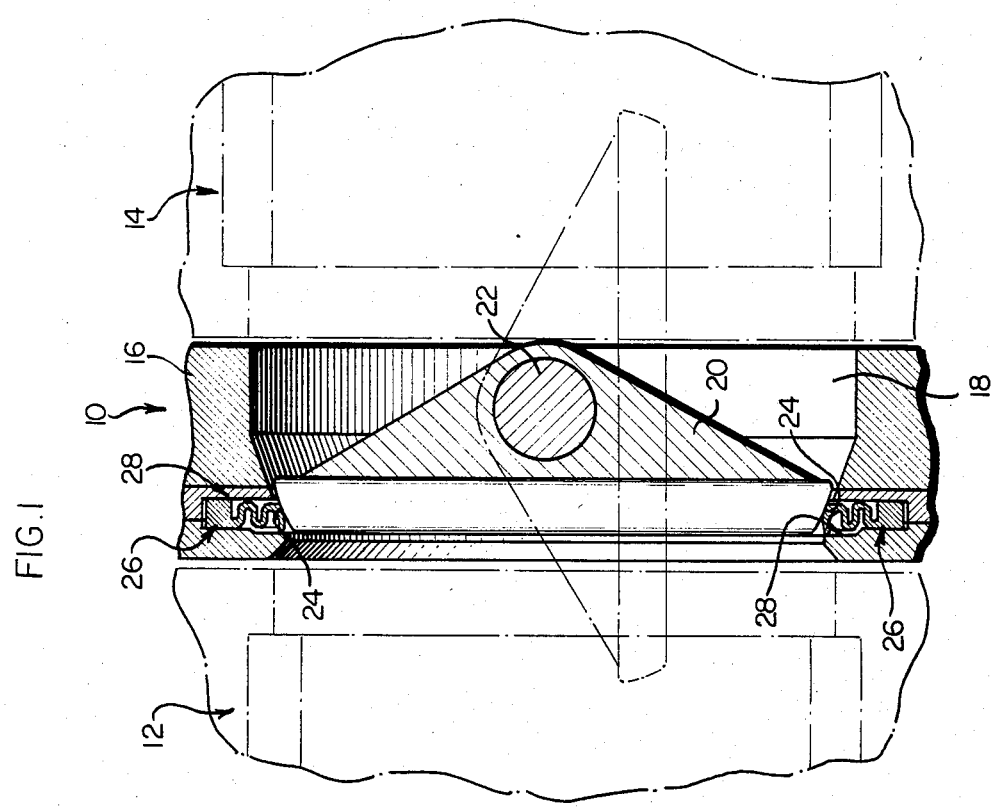
FIG. 1 illustrates, partially in section and partially cut away, a valve embodying one form of a novel sealing member and arrangement of this invention.

Referring now to the drawings, and initially to FIGS. 1-5, in FIG. 1, the overall valve is designated generally 10, which valve is interposed between a pair of fluid carrying lines or conduits designated generally 12 and 14, (illustrated in phantom line) to control the flow of fluid in either direction between said lines or conduits. Broadly speaking, the valve 10 is of the type comprising a valve body 16 defining a flow passage 18 therethrough which is adapted at opposite ends for connection in conventional matter with the conduits 12 and 14. A flow control member 20 is mounted within the flow passage 18, and comprises, in the illustrated embodiment, a conventional flow control disc rotatably supported on a shaft 22, in conventional fashion. Accordingly, the disc 20 may be rotated relative to the body 16 and passage 18 by conventional control or actuator means (not shown) between a valve open position, illustrated in phantom outline in FIG. 1, and a valve closed position, illustrated in solid outline in said FIG. 1. The periphery of the disc 20 defines an annular sealing surface 24 which may be conventionally crowned in transverse section, preferably having a spherical curvature.

When the flow control member 20 is in its closed position, the annular sealing surface 24 is brought into confronting relation with an annular sealing member, designated generally 26 which is disposed within an annular support groove 28 formed in the valve body 16. The support groove 28 opens inwardly of the valve body 16 to confront the annular sealing surface 24 in close proximity thereto when the flow control member 20 is in the closed condition. In this regard, it will be noted that alternative forms may be devised, for example, in which the sealing member and its support groove are carried on the periphery of the control member 20, while the confronting annular sealing surface is defined within the valve body 16; the illustrated form, however, comprising a preferred form of the invention.

As will be described, the relative arrangement of the support groove 28, the sealing member 26 and the sealing surface 24 are such that the sealing member is disposed for some degree of elastic deflection both axially and radially to provide the desired sealing action as the disc 20 is moved from the valve open position to the valve closed position.

Figure 2:
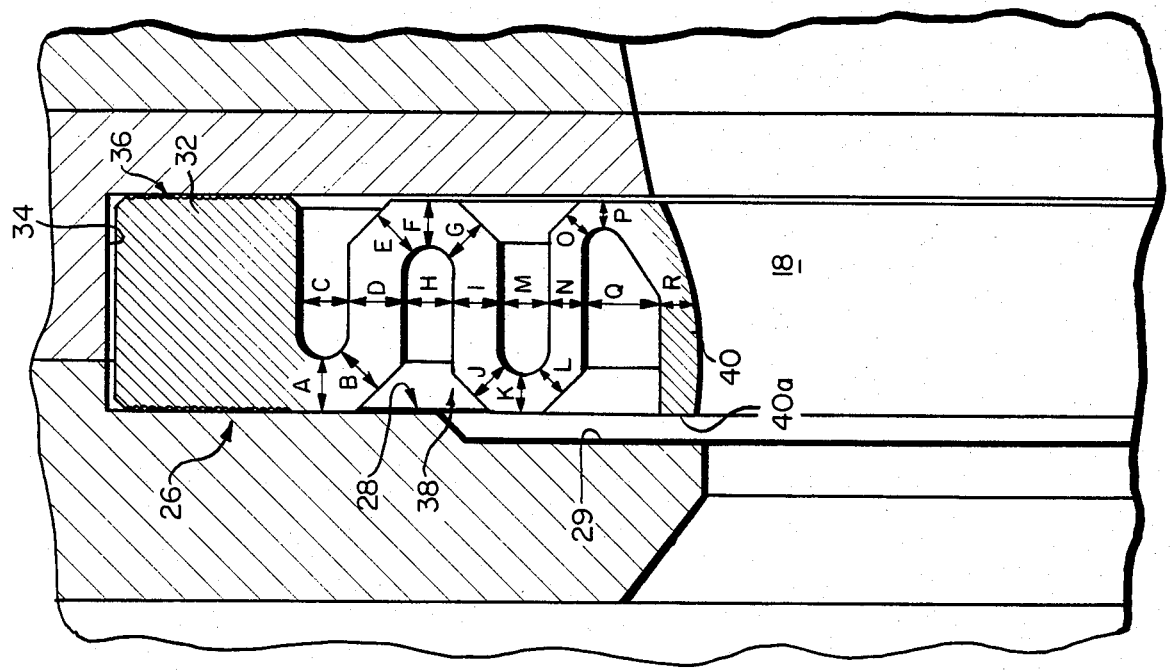
FIG. 2 is an enlarged view, partially in section and partially broken away, of a portion of the valve of FIG. 1, illustrating the novel sealing member and arrangement of the invention in greater detail and with the valve in an open position.
Figure 5:
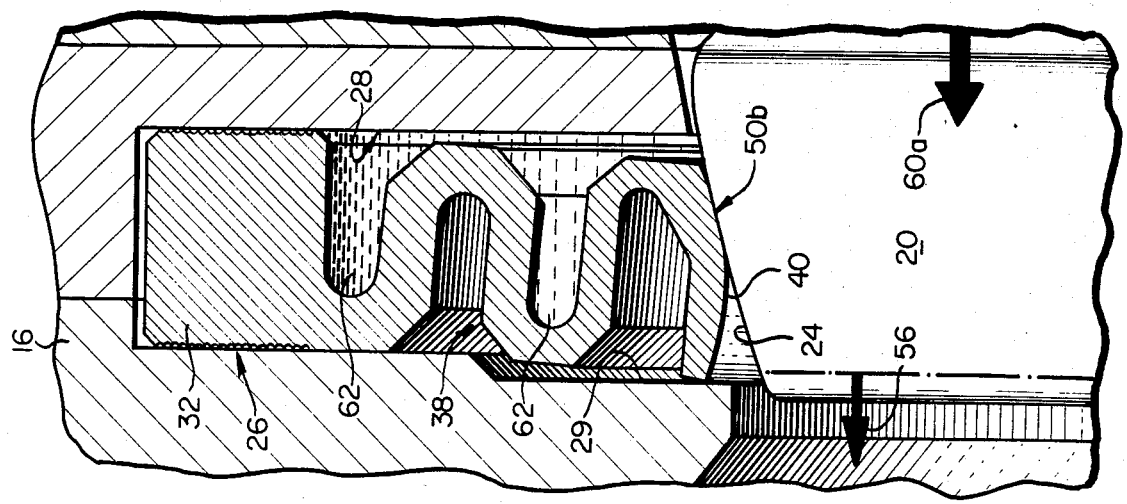
FIG. 5 is a view similar to FIG. 4, illustrating the valve in the closed position with pressure applied thereto in a direction opposite that illustrated in FIG. 4.
Figure 4:
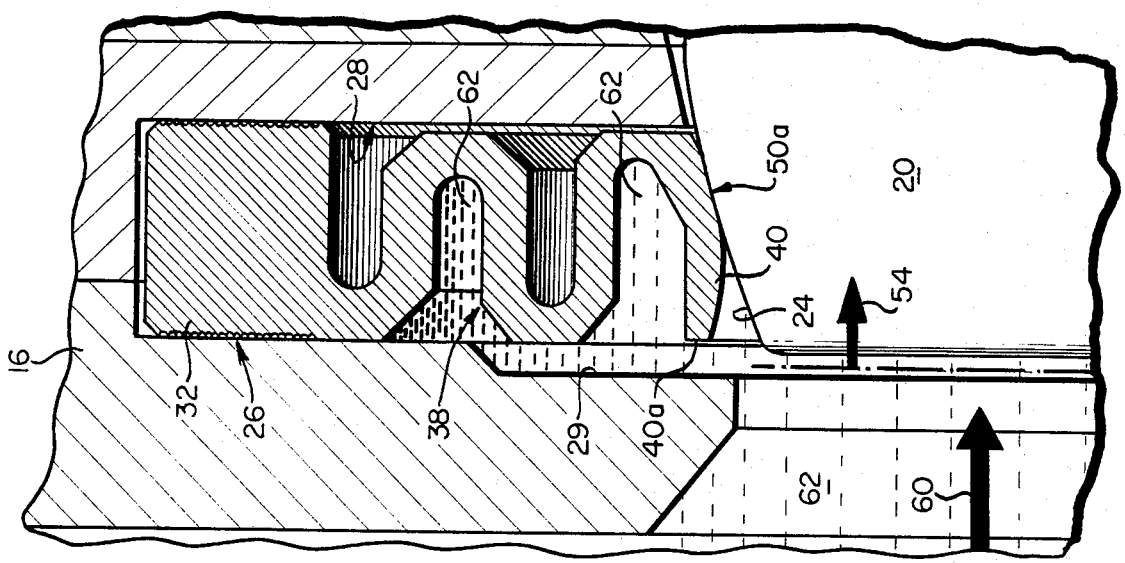
FIG. 4 is a view similar to FIG. 3, illustrating the valve in the closed position with pressure applied thereto in a first direction.
Figure 3:
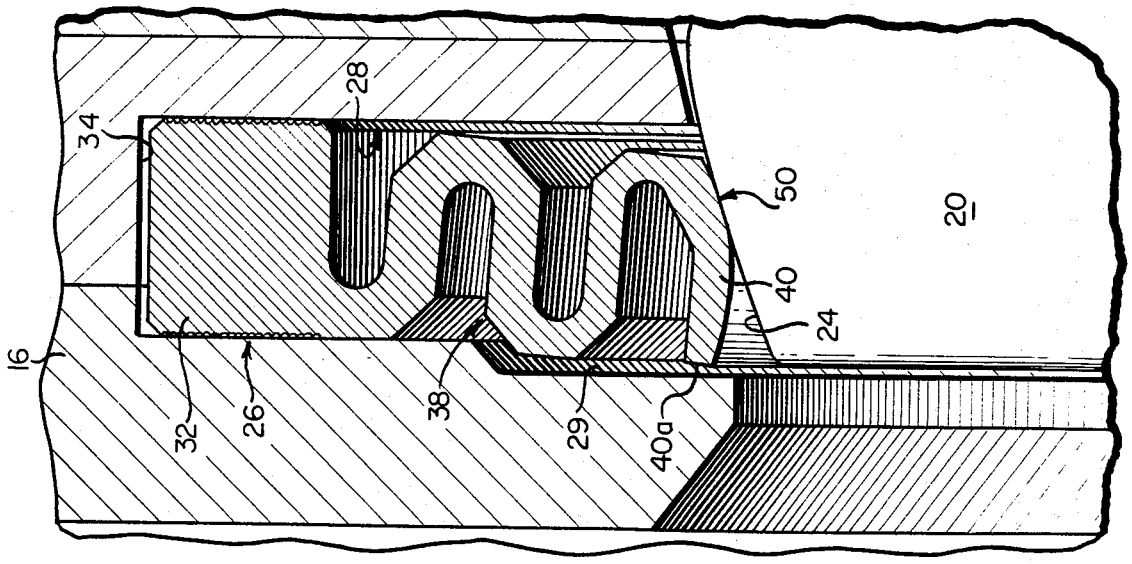
FIG. 3 is a view similar to FIG. 2 illustrating the sealing member and arrangement with the valve in the closed position, prior to application of fluid pressure thereto.

The structure and relative arrangement of the sealing member 26, support groove 28 and sealing surface 24 are shown in greater detail in FIGS. 2 through 5. Specifically, FIG. 2 illustrates the condition of this sealing arrangement and of the sealing member 26 immediately prior to the engagement of the sealing surface 24 of the disc 20, with the sealing member 26. FIG. 3 illustrates the initial sealing contact between the sealing member 26 and sealing surface 24, and in the absence of pressurized fluid in lines 12 and 14. FIGS. 4 and 5 on the other hand illustrate the sealing arrangement of the invention when fluid is present and the seal 26 and the closure member 20 are both pressure loaded alternately in opposite directions.

Referring initially now to FIG. 2, it must be kept in mind that the sealing member 26 and its support groove 28 are of an annular configuration, said FIGS. 2 through 5 illustrating the cross-sectional profiles thereof. The sealing member 26 includes a first, base or anchoring portion 32, which is positioned in a cooperating, bottom or retaining portion 34 of the support groove 28. The anchoring portion 32 is clamped firmly in position by the confronting surfaces of the body segments which define the groove 28. As illustrated in FIGS. 2 through 5, the base or anchoring portion 32 includes suitable means such as a plurality of upsets or teeth designated generally 36, which bitingly engage the opposing sidewalls of the bottom or retaining portion 34 of the groove 28 or other means of sealing, such as gaskets, etc. A second or intermediate portion of the sealing member, designated generally 38, extends generally radially inwardly of the base or anchoring portion 32 and in the direction of the open end of groove 28. An end or sealing portion 40 is provided which is integral with the intermediate portion 38, and in the assembled condition said end portion 40 protrudes somewhat from the radially inner surface or open end of the groove 28 such that the end portion 40 extends into the flow chamber 18, for engagement with the sealing surface 24 on the flow control member 20.

It should be noted that the intermediate portion 38 of the sealing member 26 of the embodiment of FIGS. 1-5 is, in cross section, seen to have a convoluted configuration, resembling a plurality of corrugations or reverse bends, with dimensions generally indicated by arrows A through R. The sealing member 26 is preferably formed by conventional machining procedures on a relatively thick stock material. Although the fabrication thereof may also be accomplished by bending, or like operations performed upon a piece of relatively thin stock material, the former method of fabrication is preferred for this embodiment, since it permits a greater control or accuracy of the dimensions obtained, and also the use of thicker stock material which affords improved resistance to corrosion, wear, or the like.

Referring now more specifically to the above-mentioned dimensions A through R inclusive, it will be noted that the thickness of the portion 38 generally decreases from its confluence with the base or anchoring portion 32 to the end portion 40, which engages sealing surface 24. Advantageously, it has been found that maintaining suitably chosen, gradually decreasing dimensions in this fashion renders the sealing member 26, and more particularly the portion 38 thereof substantially equivalent to a beam with uniform stress. More accurately, the portion 38 might be viewed as a beam of uniform stress folded over or convoluted in the fashion described, to fit within the allotted space. In this regard, it will be remembered that FIGS. 2 through 5 illustrate a cross sectional view of a generally annular sealing member 26. The principle of the beam of uniform stress is generally well known, and need not be described in detail. Suffice it to say, that it is known that a beam of generally descreasing cross sectional area or thickness, but of uniform transverse dimension, when loaded at a given point, will tend to carry the stress of the load substantially uniformly distributed throughout its length. Suitable formulas and tables are generally available for determining suitable cross sectional dimension or thicknesses along the length of such a beam, given the other dimensions of the beam, the valve of the load to be applied thereto, and the point of application. While the absolute dimensions at indicated locations A through R, inclusive, as well as the relative values thereof will vary with respect to the size of the valve, the application of the valve, and other factors, an example of values for one valve size is presented below for purposes of illustration and disclosure with respect to a specific embodiment of the invention:

| | IN. | | IN. |
|---|---|---|---|
| A | .078 | J | .060 |
| B | .076 | K | .056 |
| C | .175* | L | .053 |
| D | .075 | M | .075* |
| E | .071 | N | .050 |
| F | .068 | O | .045 |
| G | .066 | P | .040 |
| H | .075* | Q | .105* |
| I | .064 | R | .050 |

*It should be noted that the values "C", "H", "M" and "Q" relate to the distance between convolutions, and not the wall thickness of the material.

It will be noted from the foregoing table that while generally decreasing in dimension up to the dimension P, that the end portion 40 is somewhat thicker than the preceding portions, as indicated by the dimension R. It will be appreciated that there is a practical minimum thickness for the sealing surface engaging portion 40, to minimize the effects of wear or the like thereon as might be experienced due to the repeated instances of engagements and disengagements with the sealing surface 24, or the exposure to abrasive material in service.

Attention is next directed to the support groove or channel 28. It will be seen that a radially inward portion 29 thereof is of somewhat greater axial dimension or breadth than the convoluted or intermediate portion 38 of a sealing member 26. Accordingly, as will be more fully described hereinafter, provision is made in this portion 29 of the groove or channel 28 for axial movement or deflection of the sealing member 26.

Referring now to FIGS. 3-5, and in accordance with the described features of the sealing member 26, its advantageous cooperation with the sealing surface 24 of control member 20 is seen during operation of the valve 10. Looking initially to FIG. 3, it will be remembered that the disc 20 has been moved to its closed position, thereby blocking the passage 18, however, no pressurized fluid is present at either side of the control member 20. Accordingly, as the sealing surface 24 of the flow control member 20 brought into contact with the end portion 40 of the sealing member 26, engagement taking place generally along a surface portion on said end portion 40 designated 50.

By comparing FIGS. 2 and 3, it can be seen that upon engagement of the sealing surface 24 with the confronting portion 40 of sealing member 26, the intermediate section 38 and end portion 40 deflect axially to the left, as viewed in FIG. 3. Upon final advancement of the disc 20, the portion 38 of sealing member 26 will in addition to the axial deflection be radially deflected or compressed to a slight degree. Preferably the relative dimensions of the flow control member 20, sealing member 26 inner diameter and the elastic stiffness of the sealing member against axial deflection are so chosen that this initial movement of the disc 20 to the closed position will effect firm, sealing engagement, generally along the surface portion 50.

As the intermediate portion 38 and end portion 40 deflect to the left, the intermediate section 38 will flex in a manner similar to a beam loaded at its free end. Advantageously, due to the described design of the sealing member 26, and in particular the intermediate portion 38 thereof, viz., with the decreasing thickness of sections A-P, the loading forces imposed thereon during flexing are distributed uniformly along the effective length of the intermediate portion 38. If this were not the case, the major portion of the load or movement would have to be carried proximate the area of attachment of the intermediate portion 38 to the anchoring portion 32, that is proximate dimensions A and B. Accordingly, the thickness here would have to be increased as would the remainder of the seal, which would tend to reduce the resiliency so important in attaining the desired sealing action.

In accordance with the invention, then, the described axial deflection and slight radial deflection or compression of the portion 38 may be characterized as elastic deflection. By this is meant that the sealing member 26, configured in accordance with this embodiment of the present invention, will deflect, but this deflection is not permanent, as the seal will reliably return to its original position and shape, when the valve control member 20 is again open, relieving the loading forces applied thereto. Viewed another way, the described configuration substantially precludes detrimental permanent deformation of the sealing member 26 from occurring during operation, in spite of the stresses applied thereto and the described compound movement or axial and radial deflections thereof in response to this loading.

Referring now to FIG. 4, with the flow control member 20 in the closed position as illustrated and described with reference to FIG. 3, fluid 62 is applied at the left hand side of the valve as viewed in FIG. 4, resulting in the application of pressure in the direction generally indicated by arrow 60. This application of pressure may cause a slight axial shift or movement of the flow control member 20, indicated by the arrow 54 proceeding from a phantom line indicating the position the leading edge of control member 20 when no pressure is applied thereto (as was illustrated in FIG. 3). Moreover, the application of fluid 62 and pressure associated therewith as indicated by the arrow 60 will also deflect the portion 38 of sealing member 26, in an axial direction generally opposite its described axial deflection upon initial closing of the flow control member 20 (as was illustrated in FIG. 3). Accordingly, when pressurized as shown in FIG. 4, the intermediate portion 38 of sealing member 26 will move to the right slightly, which causes the surface 50a to move along the spherical sealing surface 24, resulting in further slight compression of the intermediate portion 38. Advantageously, the fluid 62 enters at the left hand sides of the convolutions of the intermediate portion 38 and tends to oppose the axial deflection forces imposed thereon by the engagement with the sealing surface 24. Consequently, a firm and reliable sealing contact is maintained between the portion 40 of sealing member 26 and sealing surface 24 of flow control member 20, generally in the area indicated by reference numeral 50a.

Referring to FIG. 5, the operation of the sealing components according to this invention is illustrated with fluid 62 applied from the opposite or right hand side, applying force as indicated by arrow 60a. In similar fashion to that described with reference to FIG. 4 above, such application of fluid may cause slight axial movement or displacement of the flow control member 20, as indicated by the arrow 56. Said flow control member 20 moving from the phantom line indicated position to that as illustrated. Moreover, it will be seen in FIG. 5 that the fluid 62 now enters the opposite or right hand surfaces of the convoluted portion 38 of sealing member 26. More specifically, it will be seen that the fluid 62 tends to deflect the intermediate portion 38 axially to the left hand, as viewed in FIG. 5, until the sealing portion 40 abuts the left hand surface of support groove or channel portion 29. Further in this regard, it will be noted that the curved or spherical surface configuration of the sealing surface 24 is such that a somewhat larger diameter portion thereof is placed in contact with the outboard surface of portion 40 of the sealing member 26, due to the movement as indicated by arrow 56, of the flow control member 20. Accordingly, firm seal is maintained with fluid applied in the direction indicated by arrow 60a as well. It will once again be noted that the configuration of the portion 38 of sealing member 26 is such that the stresses applied thereto during this mode of operation are substantially uniformly distributed, and result in substantially elastic axial and slight radial deflection and/or compression thereof, thereby substantially eliminating or avoiding any detrimental plastic or permanent deformation thereof.

Figure 6:
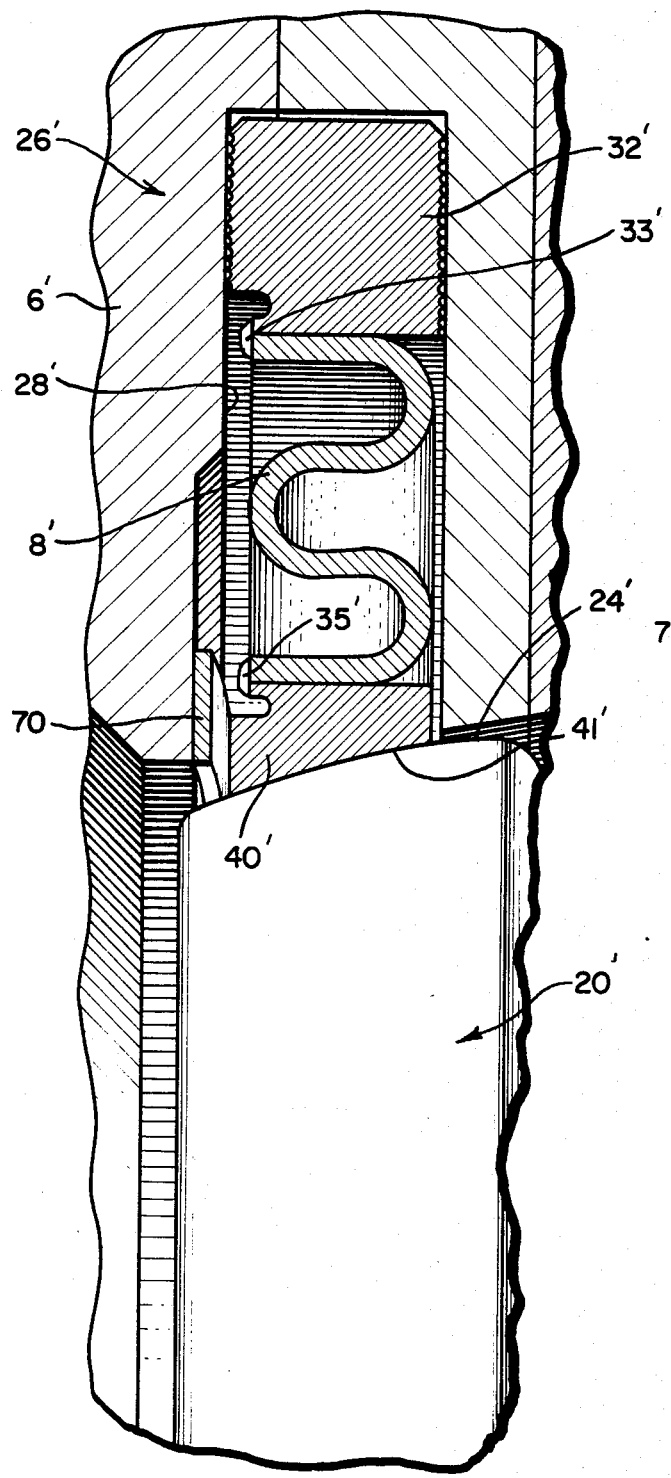
FIG. 6 is a view similar to FIG. 3, illustrating a modified form of the invention.

Attention is now directed to an alternate or second embodiment of the invention, as shown in FIG. 6. In this embodiment, similar components of the seal to those discussed above are designated by like reference numerals primed ('). The primary difference between the seal assembly discussed above and that of FIG. 6 are, first, the sealing portion 40' is provided by a relatively massive, rigid annular seat or seal element; secondly, the intermediate section 38' is of relatively thin wall thickness and does not decrease in thickness in the direction toward the seal element 40'; and thirdly, there is provided an annular wave spring 70. The operation of the overall sealing assembly 26' will be detailed, more fully hereinafter, after consideration of the construction as shown in FIG. 6.

More specifically, the sealing assembly 26' is shown in conjunction with a valve body 16' having a flow control passage 18'. A flow control member, in the form of a disc 20' is rotatably mounted within the passage 18' and includes an annular sealing surface 24', which may be spherical or crowned as shown, or if desired, relatively flat. The body 16' defines an annular sealing member support groove 28' in which the seal member 26' is disposed and held in position in a conventional manner, with the seal or seat element 40' extending from the groove for engagement with the sealing surface 24' on disc 20'.

Attention is now directed to the construction of the seal member or assembly 26' of this form of the invention. More specifically, the seal member 26' includes a base section 32' which is clamped in place between the wall surfaces of groove 38'. Affixed to the base section 32' by weld 33' is an intermediate section 38'. This intermediate section 38' is corrugated with the convolutions extending generally axially. It should be noted that the wall thickness of these corrugations do not decrease and are on the whole thinner than those of the previously discussed embodiment. Affixed to the radially inner portion of the intermediate section 38' by a weld bead 35' is the seal or seat section 40'. The seal member 40' includes an annular sealing surface 41' that is lapped or formed to conform to the sealing surface 24'. As a further matter, the sealing portion 40' is provided by an annular section that is relatively rigid and will not flex easily in the radial direction. Further the seal assembly 26' includes a wave spring 70 provided interiorly of the groove 38' and serving to bias the seal member 40' axially toward the sealing surface 24' on the disc.

There are several important distinctions between the seal 26 and seal 26' of the embodiment of FIG. 6 that should be noted. First, as mentioned briefly above, the wall thickness of the corrugated intermediate section 38' is less, and as such the intermediate section 38' is somewhat more flexible in both the axial and radial direction. Secondly, the seal portion 40' is rigid and cannot flex or expand radially. The increased radial flexibility of the intermediate section 38' enables the rigid, annular seal portion 40' to move in the radial plane as needed to adJust to or assume a co-axial position with respect to the sealing surface 24', thereby enabling attainment of surface-to-surface contact between surfaces 24' and 41' about the entire annular extent of the surface interfaces. The flexible nature of intermediate section 38', however, does not provide sufficient axial biasing force under all operating conditions to insure adequate sealing contact. Accordingly, the wave spring 70 is included to urge the seal portion 40' axially and insure that the surfaces 41' and 24' are in firm sealing contact.

The operation of the seal assembly 26' is similar to the embodiment 26 as previously discussed. Briefly, as the disc 20' is moved to the closed position, FIG. 6, the surfaces 41' and 24' are brought into full annular engagement, and line pressure will result in a slight axial shifting of the disc 20'. The radial flexibility of the intermediate section 38' allows the seal portion 40' to adjust in the radial plane to permit surface-to-surface contact along the interface of surfaces 41' and 24'. Also during this operation, the wave spring 70 operates to urge the seal portion 40' axially into firm sealing engagement with the sealing surface 24', without regard to orientation of the valve with respect to fluid flow. The fact that surface 41' is lapped to conform to sealing surface 24' serves to help insure proper sealing contact.

Figure 7:
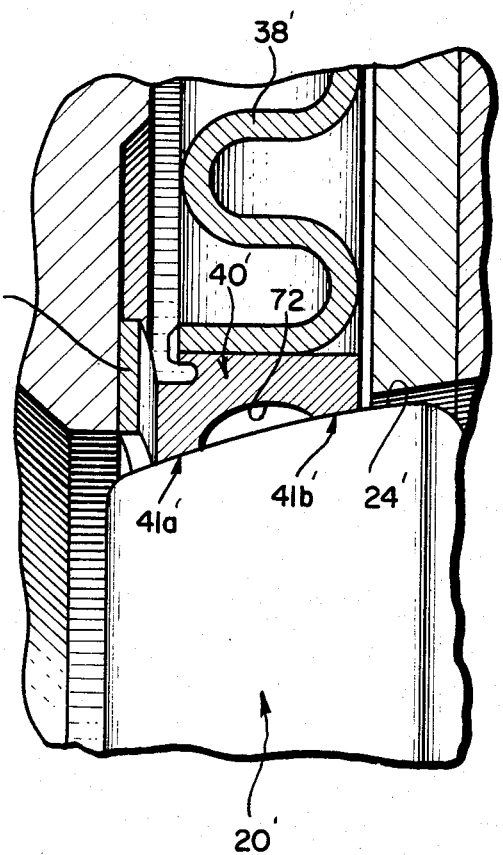
FIG. 7 is a partial sectional view similar to FIG. 6 illustrating a further modification.

FIG. 7 illustrates a variation to the embodiment of FIG. 6. In this regard seal element 40' has a relief groove 72 machined into sealing surface 41' to define two distinct disc contact areas 41a' and 41b'. Each disc contact area 41a' and 41b' is machined or lapped to conform to the sealing surface 24' of the disc 20: The inclusion of relief groove 72 serves to concentrate the sealing forces and results in a high ratio for the sealing force per unit area of contact. Similar to the embodiment of FIG. 6, a wave spring 70 is provided to urge the seal element 40' axially into contact with surface 24'.

While several specific embodiments of the invention have been illustrated and described, it is contemplated that those skilled in this art may devise various alternatives or modified structures without departing from the spirit of the present invention., as such it is intended to cover all such alternatives or modified structures falling within the spirit and scope of the claims appended hereto.

The invention is claimed as follows:

1. A valve comprising, in combination; a first element constituting a valve body and defining a flow passage extending therethrough, a second element constituting a flow control member movably supported relative to said body for movement between an open position and a closed position for opening and closing said flow passage, one of said elements defining an annular sealing surface, and the other of said elements defining an annular sealing member support groove oriented to confront said sealing surface, an annular sealing member disposed in said support groove, said sealing member having a base section held in said support groove, and a sealing portion confronting said sealing surface for sealing engagement therewith, an intermediate section of metallic material joining said base section and said sealing portion including, a plurality of convolutions of decreasing thickness in the direction of said sealing portion so as to approximate a beam with uniform stress, for enabling said intermediate section to flex without permanent deformation while distributing stress in the convolutions substantially uniformly when the sealing member is in engagement with the sealing surface.

2. A valve according to claim 1, wherein said support groove is formed on the body of said valve, with said sealing surface being formed upon said flow control member.

3. A valve according to claim 1, wherein said flow control member is a disc element disposed in said flow passage and carried by a stem rotatably mounted with respect to said valve body.

4. A valve according to claim 1 wherein said sealing portion and said base and intermediate sections are of a one-piece construction.

5. The valve defined in claim 1 wherein said base section is of a solid rectangular cross-section.

6. A sealing assembly for a valve of the type including a first element constituting a valve body and defining a flow passage extending therethrough, a second element constituting a flow control member movably supported relative to said body for movement between an open position and a closed position for opening and closing said flow passage, one of said elements defining an annular sealing surface, the other of said elements defining an annular support groove for the sealing assembly and oriented to confront aid sealing surface in close proximity thereto, said sealing assembly comprising a base section, and a sealing portion joined to said base section by an intermediate section of metallic material said intermediate section including a plurality of corrugations, such that said sealing portion is resiliently mounted and free to move slightly in the radial direction to adjust to said sealing surface, while being urged axially for engagement with said sealing surface, said intermediate section corrugations being of a decreasing wall thickness in the direction toward said sealing portion so as to approximate a beam of uniform stress thereby enabling said intermediate section to flex axially without permanent deformation with substantially even distribution of stress along said intermediate portion.

* * * * *